Jan. 30, 1968 R. JURK ET AL 3,366,734

METHOD AND SYSTEM FOR SCANNING A RECORD CARRIER

Filed April 23, 1964 4 Sheets-Sheet 1

METHOD AND SYSTEM FOR SCANNING A RECORD CARRIER

METHOD AND SYSTEM FOR SCANNING A RECORD CARRIER

Filed April 23, 1964 4 Sheets-Sheet 3

METHOD AND SYSTEM FOR SCANNING A RECORD CARRIER

Filed April 23, 1964 4 Sheets-Sheet 4

United States Patent Office 3,366,734

Patented Jan. 30, 1968

3,366,734

METHOD AND SYSTEM FOR SCANNING A RECORD CARRIER

Rolf Jurk, Karl Heinz Busch, and Peter Schröer, Munich, Germany, assignors to Siemens Aktiengesellschaft, Munich, Germany, a corporation of Germany Filed Apr. 23, 1964, Ser. No. 362,116
Claims priority, application Germany, Apr. 26, 1963, S 84,924
21 Claims. (Cl. 178—6.8)

ABSTRACT OF THE DISCLOSURE

Method of scanning lines of text in parallel scan columns an area extending in the line direction at a width covering a single line, setting the speed of scanning in the line direction at increased rate relative to record carrier speed whereby successive scanned areas overlap, storing during scanning signals representative of the presence of information, recogniizng the occurrence of a sequence as indicative of reaching a line of text, and reducing the speed of scanning advance such that successive scanned areas are adjacent each other.

Our invention relates to a scanning method and system for the automatic reading of alphabetic letters, numerals, symbols and other characters and, in a more particular aspect, to the columnar scanning of a page-type or line-by-line text.

The operation of communication or data processing equipment often requires automatic scanning of characters on record carriers and supplying the resulting scanner signals to logic circuits, such as for automatically identifying the characters, in order to correspondingly control a printer, typewriter, puncher, computer, or other output device. Particular difficulties are encountered in cases where the characters to be scanned constitute a line-by-line text.

The automatic processing of such a line-by-line text requires the scanner to sequentially cover different areas of the record surface, each scanning area or "frame" being occupied, for example, by a single line of text. Such an in-frame alignment of each individual line of characters might be secured with the aid of mechanical devices which impart to the record carrier a motion relative to the scanner in a direction perpendicular to that of the text lines. Generally, however, it is not always certain at which particular location of the record carrier the first line of text, and consequently the uniformly spaced other lines are situated. This may make it infeasible to obtain a satisfactory reading of a line-by-line text. That is, although the scanner will operate in correctly dimensioned scanning bands or frames extending across the record carrier and each dimensioned to cover just one line of text, the phase position of the text lines is usually inaccurate so that, for example, the scanner may view the lower portion of a text line together with the upper portion of the next following line within a single frame.

To avoid such trouble, reference markers can be placed upon the record carrier to indicate when a line of text is fully located within the scanning frame, and the beginning of a scanning band can be made dependent upon the appearance of such a marker, for example a guide bar located a normal line spacing above the first line of text.

Thus it has become known from U.S. Patent 2,906,819 to commence the scanning operation by having the scanning point first scan only the margin of the record carrier in a vertical direction until the scanning point encounters a marginal marker indicative of the appearance of a text line. Only then does the scanner commence to scan in the horizontal direction until it encounters a control marker indicative of the presence of a character to be identified. Thereafter, the scanning of the character is performed and completed. This is followed by another horizontal scanning operation until another control marker is encountered as being indicative of the presence of the next character, and so forth. When the scanning of a line is completed in this manner, the scanning point returns to the margin and resumes vertical scanning until it encounters a new marginal marker indicating the presence of the next line of text. This initiates another cycle of horizontal scanning.

Often, however, it is undesirable or impossible to provide such reference markers. This poses the problem of doing away with such auxiliaries but nevertheless affording a frame-by-frame scanning of a text page.

U.S. Patent 2,932,006 deals with scanning a single line of text as it moves in the line direction past the sensing gap of a photocell device. The scanner signals generated by the arriving front edge of a character are used for issuing a command that releases the scanning of that character in synchronism with its advancing motion past the photocell gap. This method avoids signal or processing errors as may be due from lack of synchronization between the scanning and the advance of the record carrier, but some loss of information must be put up with because, when the scanning of each character is being commenced, the first signals are not available for identification of the character. Furthermore, this method is limited to the scanning of a single line of text travelling in the line direction past the scanner and cannot solve the problem of scanning a line-by-line text in such a manner that, as the record carrier advances perpendicularly to the lines, each individual line of text is just fully covered by a single scanning frame.

This also applies to a method known from U.S. Patent 3,025,495, also dealing with the scanning of a single-line text which moves in the line direction past the scanning device, while the scanning point is being deflected perpendicularly thereto. According to this method, the scanning point is deflected at a higher frequency in the gap direction when an interspace between two successive characters is being scanned.

It is an object of our invention to provide a reading method that affords columnar scanning of a page-form, i.e., line-by-line, text and avoids the above-mentioned shortcomings and difficulties heretofore encountered.

Another, more specific object of the invention is to afford scanning a page-form record during relative page-to-scanner advancing motion while eliminating the necessity of providing the record carrier with reference markers for recognizing the commencement of a paragraph or other text portion.

Another object of our invention is to afford using the first line of characters in a text portion as a reference for proper in-frame alignment of the first line and the following lines of characters without any loss of information as to all of the characters being scanned.

More particularly, it is an object of our invention to perform the columnar scanning of a page-form record to be automatically read while advancing relative to the scanner in a direction perpendicular to the lines of text, in such a manner that each individual scanning band across the page area will fully cover an individual character line of each text portion, including the entire first line of such portion.

Still another object of our invention is to make the commencement and in-frame alignment of the scanning operation free of errors as may result from defects, erratic and meaningless markings or soiling of the record carrier.

Another object of the invention is to automatically secure a reliable commencement and scanning-frame adjustment also in cases where the last line of a text portion is irregularly spaced from the first line of the next text portion.

It is also an object of our invention, subsidiary to any of those mentioned above, to afford operating during framewise page scanning with a continuous and uniform or substantially uniform advancing speed of the record carrier, thus permitting a relatively simple design of the mechanical devices required.

To achieve these objects and in accordance with a feature of our invention, a line-by-line text on a record carrier advancing relative to a scanner in a direction perpendicular to the text lines, is scanned by the following method: A band-shaped frame area of the record carrier at a time is scanned by parallel scan columns perpendicular to the line direction, the frame area of the band thus extending in the line direction across the record carrier with a band width sufficient to fully cover a single line of text. During such frame-band scanning, we first set the advancing speed of the scanning motion in the direction of the text line (horizontal directions) to a high value and thereby cause the successively scanned bands to overlap each other to such an extent that an area portion of the record carrier sufficient for occupancy by a text line is sequentially included in at least two scan bands. During this stage of overlapping-band scanning, we store any occurring scanner signal elements "1" in accordance with their positional occurrence within a scan column and together with any previously stored scanner signal elements "1." We further count at the end of each band the number of signal elements "1" thus stored in sequence and, when the number of scanner signal elements "1" in the stored sequence is within predetermined limits, we take the occurrence of this sequence as being indicative of the fact that the first character line of the text portion has been reached. In response to such occurence we then reduce the advancing speed of the scanning operation in the text-line direction (horizontal direction) to the extent required to eliminate the overlapping of the bands, so that from now on the successive scanning bands are approximately adjacent to each other, and each line of text is just covered by a single scanning band.

The term "scanner signal element '1'" or "projection signal element '1'" is herein understood to denote a signal element which issues from the scanner when the scanning point encounters an area element of the record carrier that is covered by a character. This signal element "1" is often called "black" signal element regardless of the actual color of the characters. A scanner or projection signal element "0" is herein understood to refer to a signal element issuing from the scanner in response to the scanning point encountering an area element of the record carrier that is not covered by a character but corresponds to the background. This signal element "0" is often called "white" signal element regardless of the actual color of the background.

According to another feature of our invention, we perform the above-described method by means of a scanner system which, aside from the drive means for continuously advancing the record carrier at constant speed and the columnar scanner for reading the line-by-line text, comprises the following components. Two 1-bit storers, such as flip-flop stages, serve to control the scanner to operate at high and low horizontal scanning speeds respectively. The first storer is activated by a start pulse at the beginning of a record scanning operation, for example by the attending person depressing a pushbutton. The first storer, thus activated, then issues a command to the scanning device for initiating the fast scanning advance in the direction of the lines of text. The second storer has its control (set) input connected through an AND gate with the output of the first 1-bit storer. When the first line of a text portion is reached, the coincidence conditions for the AND gate are met so that the second storer is activated and issues to the scanning device a command which reduces the speed of the scanning advance in the line direction while simultaneously resetting the first 1-bit storer.

According to another feature of the invention, we provide the system with a ringshift register whose bit storage capacity permits storing the signal elements that occur within a single (vertical) scanning column. The input of this register reecives sequentially the scanner signal elements issuing from the scanner during scanning of each individual column. As a result, the ringshift register always contains in storage the "projection" of at least the last-scanned portion of the scanning band. That is, when a scanned line contains identifiable characters so that scanner signal elements "1" are being issued as the scanning point travels stepwise through one or more vertical scanning columns (scans), the sequence of signal elements "1" ultmiately memorized in the ringshift register constitutes an image of the orthographic projection of the character or line of characters scanned.

It is further preferable to connect a counter with the output of the ringshift register and to provide the counter with an output at the counting stage that corresponds to the given minimum number of signal elements "1" which the projection of an identifiable character is supposed to have. Connected to this counter output is the control (set) input of a bistable flip-flop stage. Another stage of the counter, corresponding to the maximum number of the signal elements "1" that are to be contained in the projection of a character or a line of characters, is connected to the reset input of the same bistable flip-flop. The output of the bistable flip-flop is connected to the second control input of the above mentioned AND gate between the above-mentioned first and second 1-bit storers.

As will more fully appear from the following, the invention fully obviates the need for added reference markers on the record carrier for ascertaining the commencement of a text portion, because the first character line of a text portion itself serves as a reference for proper in-frame setting of the first text line relative to the scanning band and consequently also for the in-frame setting of the subsequent text lines following at uniform distances within the same text portion. Such self-adjustment is achieved without any loss in information. Since the scanning advance within a scanning band in the text-line direction is slowed down only upon recognition of a sequence of projection signal elements "1" at the end of a scanning band, and only if the sequence contains a number of signals within predetermined limits, the invention also affords the advantage that only the first line of a text portion rather than any small defects such as impurities of the record carrier will release the reduction in scanning speed. Since the invention can be applied with a continuous advancing motion of the record carrier, relatively simple mechanical means are satisfactory.

It may be preferable to modify or compensate the continuous advancing motion of the record carrier, for the duration of the scanning within each scanning band, by super-imposing upon the vertical deflecting voltage for the scanning point a saw-tooth voltage whose amplitude corresponds to the advancing speed of the record carrier, whose polarity is opposed to that of the vertical deflection voltage, and whose frequency corresponds to the scanning advance within the scanning band in the direction of the text lines.

According to a further feature of our invention, we provide in the following manner for automatic in-frame alignment in the event the last line of a text portion is irregularly spaced from the first line of the next portion. If during slow-advance scanning of a band, no identifiable character is recognized in that entire band, this absence of characters is utilized for returning to the high advancing speed of the scanning operation in the line direction so that the scanning bands again overlap each other to the above-mentioned extent. Consequently, now again an area of the record carrier that might be occupied by a line of text is sequentially covered by at least two scanning bands. As soon as under these fast scanning conditions the arrival of the new text line is recognized in the above-described manner, the scanning advance within the bands is again reduced, also as described above. As a result, the invention affords reading a text that comprises a plurality of portions even if the spacing between the last line of a text portion and the first line of the following portion is irregular, namely substantially different from an integral multiple of the normal line spacing. This makes it unnecessary to rely on attending personnel for adjusting the scanning device to a new text portion, so that a fully automatic reading performance is secured.

The above-mentioned objects, advantages and features of our invention, said features being set forth with particularity in the claims annexed hereto, will be apparent from and will be mentioned in the following in conjunction with embodiments of scanning systems and component devices illustrated by way of example on the accompanying drawings in which:

FIGS. 6*a* to 6*h* show schematic circuit diagrams of individual components applicable in a system according to FIGS. 3 to 5.

Figure 1:
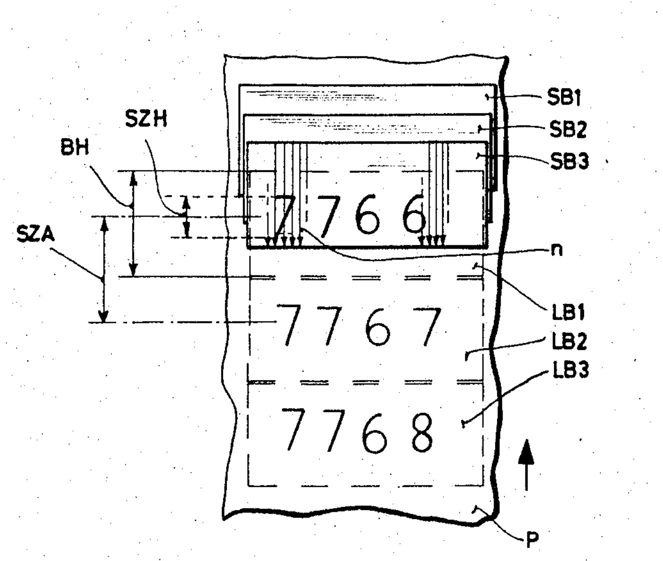
FIGS. 1 and 2 are explanatory and show parts of a record carrier and a schematic indication of a scanning operation.

FIG. 1 serves to elucidate the manner in which a record carrier P is scanned by the method of the invention. The record carrier P contains a line-by-line text which in the illustrated example is represented by multi-digit numbers. The text is to be read by means of a scanning device which is to automatically cover one line of characters after the other. For this purpose the record carrier travels relative to the scanner in a direction perpendicular to the text lines as indicated by an arrow.

During continuous travel of the record carrier P the scanner operates to cover a frame area of the record surface by a multiplicity of parallel scanning columns (scans) schematically indicated at *n*. After a column is scanned downwardly in accordance with clock pulses which incrementally advance the scanning point, this point rapidly switches upwardly to the next following column and repeats its step-by-step downward travel, and so forth, until a complete scanning band (SB1 . . . SB3, or LB1 . . . LB3) is covered. Each such band or frame extends transversely across the record carrier and has a width sufficient to cover a single line of text, as is apparent from FIG. 1.

The vertical point-by-point scanning in each column is effected at a relatively high frequency. The deflection of the scanning point in the horizontal direction takes place at a comparatively low frequency. Depending upon whether the scanning point is being deflected more rapidly or more slowly in the horizontal direction, the record carrier P travels a larger or smaller distance past the scanner during the interval of time in which a single complete scanning band across the record carrier P is completed.

For the duration of the scanning performance within one and the same band, the continuous travel motion of the record carrier P in the direction of the arrow is preferably equalized by imposing upon the vertical deflection voltage, which shifts the scanning point in the direction of the scanning columns *n*, a saw-tooth voltage of the above-mentioned lower frequency having an amplitude corresponding to the advancing speed of the record carrier and a polarity opposed to that of the vertical deflection voltage. As a result, the scanning point or, more accurately expressed, the scanning band defined by the total travel of the scanning point, is caused to follow the motion of the record carrier P so that the band will extend across the carrier in parallel relation to the lines of text. When the scanning point arrives at the end of a scanning band, the previous travel of the record carrier becomes abruptly effective because now the scanning point jumps to the beginning of a new scanning band which is displaced from the preceding band the full distance traversed by the record carrier since the beginning of the just completed band.

According to the invention, the above-described scanning of a record carrier is performed in such a manner that during columnar scanning, the scanning point is first deflected at relatively high speed in the direction perpendicular to the advancing direction of the record carrier P, so that the scanning within a band in the direction of the text lines progresses at corresponding rapidity. This has the effect that the successive scanning bands across the record carrier become mutually overlapped. Such overlapping is indicated in FIG. 1 for bands SB1, SB2, SB3 and LB1. The amount of overlapping is so large that an area of the record carrier P as might be occupied by a single line of text is successively covered by at least two sequential scanning bands. This is also apparent from FIG. 1, where the area on record carrier P occupied by the first text line, namely the text number "7766," is covered by the scanning band SB3 as well as by the band LB1. Analogously, each other area of the record carrier P, having a sufficient size for accommodating a line of text, was previously covered successively by at least two scanning bands, for example bands SB1 and SB2 or bands SB2 and SB3. The required amount of overlapping of the scanning bands will be more fully explained hereinafter.

When during scanning of each band, such as SB3, that overlaps with other bands SB1, SB2, the scanner responds to the presence of a text character and furnishes a scanner signal element "1," any such signal elements are stored in accordance with their positional occurrence within a scan column and conjointly with any scanner signal elements "1" as may have been stored from preceding scan columns of the same band.

This conjoint storing of scanner signal elements "1" can be performed continuously from the beginning to the end of each band. As a result, the sequence of signal elements "1" stored at any stage of the scanning operation constitutes an image of the orthographic projection of the previously scanned portion of the band, such as SB3, taken in the direction of the band and hence transverse to the record carrier. When the end of a band is reached, the entire sequence of scanner signal elements "1" that may then be stored, thus constitutes an image of the projection of this band in the transverse direction. If such a band has covered the first line of a text portion, the sequence of projection-signal elements "1" stored at the end of the band has a length at least equal to a predetermined minimum corresponding to the projection of a character to be automatically identified, but the sequence is not longer than a maximum predetermined for the projection of a text line. Consequently, the occurrence of a stored signal "1" sequence within given length limits at the end of a band constitutes a criterion for recognizing the arrival of the first character line of a text portion.

The above-described method of jointly storing the sequence of scanner signal elements "1" that occupy the same respective positions within the scanning columns can be modified by performing such storing not from the beginning of each band continuously up to its end, but by recognizing and storing, each time the rear end of a character has just been scanned, any continuous sequence of projection signal elements "1" that has occured in that character and contains a number of signal elements within the limits given as indicative of a character to be automatically identified. When such a sequence of projection signal elements "1" of a character just scanned in a band has been recognized and registered, the previously stored projection of this character can be cleared from the storer and, in lieu thereof, a new storing operation in analogy to the one just completed can be commenced with respect to any further scanner signal elements "1" occurring during further scanning of the same band.

With this mode of performing the method, the projection stored at any scanning stage of a band does not stem from the entire band portion previously scanned but constitutes only the projection of the last-scanned portion. In other words, the projection stored at any scanning stage of a band does not comprise the projection of those band portions that are located between the front edge of the band and the rear boundary of a previously scanned character, regardless of whether such character is a letter, numeral or symbol. Accordingly, the arrival of a first line of text is recognized at the end of the scanning band only if, during scanning of that band, there has occurred a stored sequence of projection signal elements "1" whose number of individual signals is within the limits predetermined as indicative of a character to be identified.

This has the advantage that the scanning advance within a band in the direction of the text line is slowed down only if this band has covered at least one identifiable character, but that no reduction in scanning speed takes place if the band area of the record carrier contains impurity spots whose projections, taken cumulatively in the line direction, might simulate the projection of a line of text. It is also of advantage that the method of the invention can be performed with the aid of circuits which may already be contained in the read-out equipment for reading and identifying of characters contained in a line of text.

As explained, when the arrival of a first text line is recognized by fast scanning with overlapping frame bands, the advance of the scanning point in the line direction is slowed down so that from now on the scanning bands LB1, LB2 . . . will substantially abut against each other to cover each line of text by a single band. At this lower scanning speed, each individual line of text can be read within the scanning bands, this being not further described herein because such reading of characters by columnar scanning is known as such and not essential to the present invention proper.

After the first line of a text portion is recognized and read, each further line of the same text portion, being covered by a single scanning band LB, is also being individually read by virtue of the uniform spacing of the text lines and the correspondingly uniform vertical width of the scanning bands. The position of the text portion on the surface of the record carrier P need not be known in advance. The scanning in the above-described manner is rather automatically adjusted and aligned to the first text line of the text portion. By virtue of the fact that the scanning bands overlap each other until the first text line is thus recognized, the method affords the assurance that the first text line itself is still covered by a single full scanning band LB1 under conditions that permit reading of this first line.

In the following, the scanning bands SB1, SB2 . . . which overlap each other during rapid scanning are called "searching bands" because they serve to seek and recognize the arrival of the first character line in a text portion. The scanning bands that do not overlap and are effective under slow-scan conditions for subsequently reading the first and subsequent lines of text, such as bands LB1, LB2 . . . are hereinafter called "reading bands." The required mutual overlapping of the searching bands SB1, SB2, SB3 depends upon the height BH of the searching and reading bands SB, LB, also upon the height SZH of the characters contained in the individual lines of text, and it also depends upon the spacing SZA between the lines of characters. These dimensions satisfy the condition $$\frac{\frac{1}{2}\left(\frac{BH}{K}-SZH\right)}{TSB}=\frac{SZA}{TLB}=v_p$$

wherein TSB denotes the time required for completely scanning a searching band SB, TLB denotes the time required for completely scanning a reading band LB, K is a safety factor equal to or larger than unity, and $v_p$ denotes the advancing speed of the record carrier P (in cm. per second).

Figure 2:
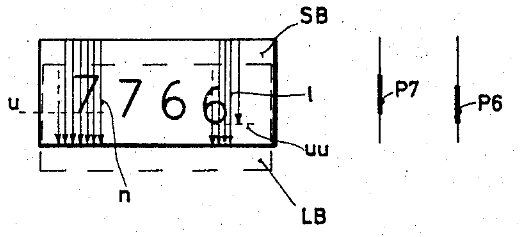

The page scanning method according to the invention desribed above with reference to FIGS. 1 and 2 is performed by the system described presently with reference to FIGS. 3 to 6.

Figure 3:
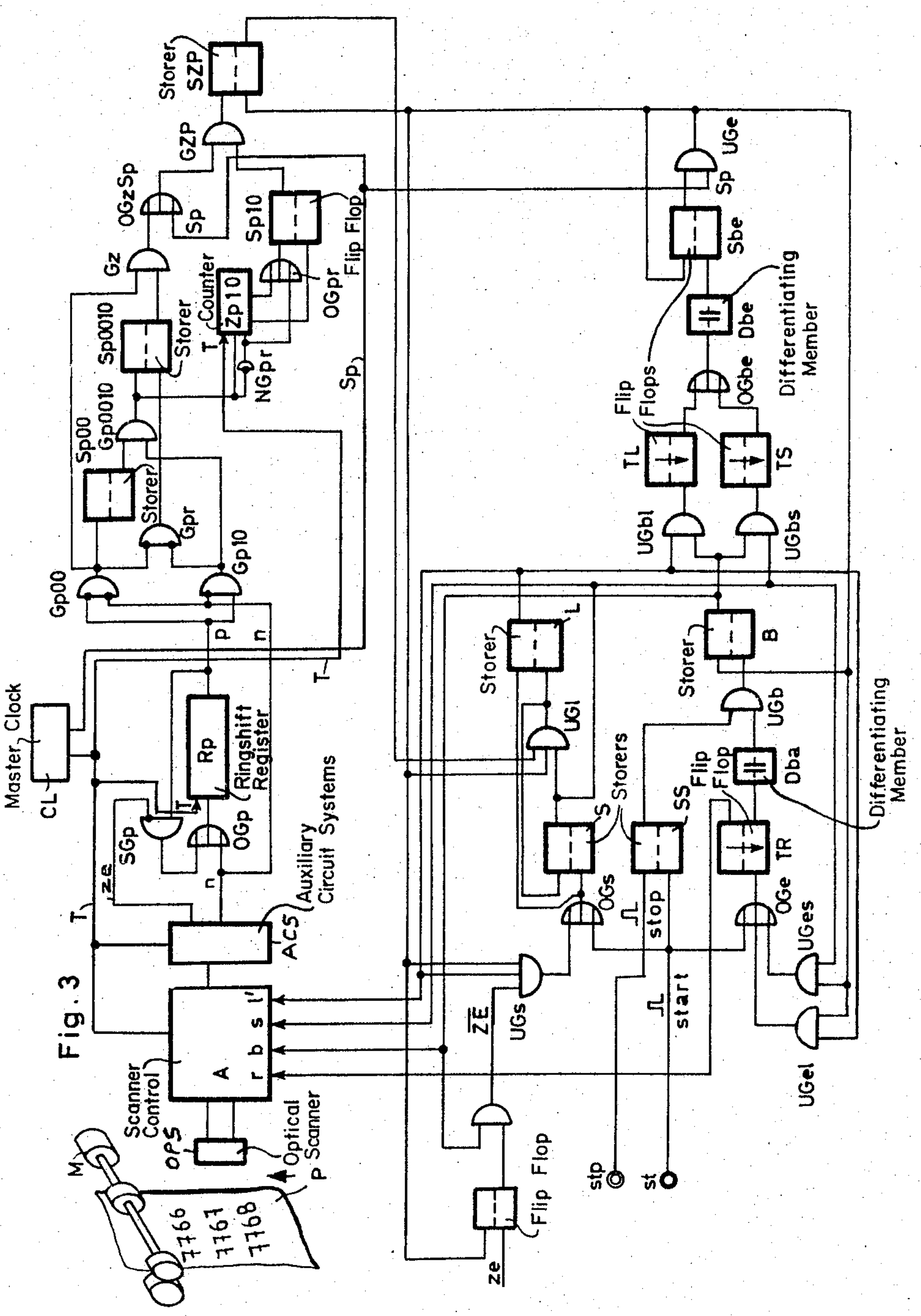
FIG. 3 is a schematic circuit diagram of a scanning system according to the invention.

The system shown in FIG. 3 is equipped with conventional means for moving the record carrier P, such as a page or strip of paper, at constant speed past the lens system of an optical scanner schematically denoted as a whole by OPS. The record carrier P is shown driven by feed rollers connected with a constant-speed motor M. The lens assembly of the scanner may throw an image of the scanning frame area, corresponding to the height and width of a single band, onto the screen or target plate of an image converter tube such as an image orthicon, such a tube being shown at R in FIG. 4. The scanner OPS proper is connected with a scanner control device schematically represented at A in FIG. 3 and shown more in detail in FIG. 4. Aside from these details described hereinafter, the means for accommodating and advancing the record carrier P at constant speed and for producing and scanning an image of the bands are not further shown and described herein because they are known as such and not essential to the invention proper. In this respect, reference may be had, for example, to the German published patent application DAS 1,095,026 (FIG. 3A), if desired.

The scanner control device A is connected with a system of logic circuits which receives and stores the scanner signals, and which performs the recognizing operations described in the foregoing. The system is feedback-connected with the scanner control device A for controlling the scanning operation to proceed in the text-like direction at respectively different speeds in dependence upon the result of the recognizing operation, also as described above.

Figure 6A:
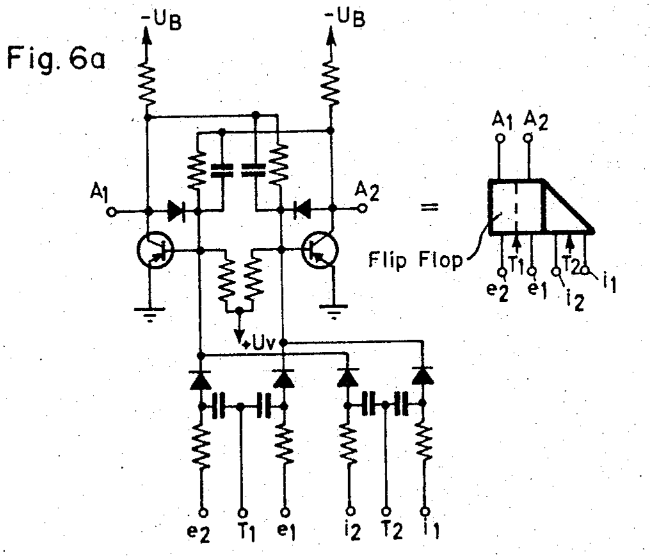

A logic system according to FIG. 3 comprises two 1-bit storers S and L. These storers, like all other 1-bit storers of the system, preferably consist of respective flip-flop stages, (FIG. 6*a*). The first storer S has its control (set) input connected with a signal lead *st* on which a start-pulse is supplied, for example by the attending person depressing a pushbutton contact. The pulse activates the storer S and thereby commences the scanning operation. When thus activated, the storer S issues to the control input *s* of the scanner control device A a command for rapid scanning advance in the line direction. Accordingly, the area of the record carrier P just being covered by the scanner is scanned so rapidly in the vertical direction of the scanning columns that the carrier is covered by the mutually overlapping searching bands SB1 . . . SB3 (FIG. 1). As will be more fully explained below, the rapid horizontal advance of the scanning cycle in response to a signal at input *s* of scanner control device A can be obtained in a simple manner by switching a capacitor of relatively small capacitance into a timing circuit for controlling the horizontal deflection of the scanning point.

The output of the first 1-bit storer S is further connected through AND gate UG1 with the control (set) input of the second 1-bit storer L whose reset input is connected to the output of the same gate UG1. As will appear hereinafter, the coincidence condition for gate UG1 is met when the first character line of a text portion is reached. The second storer L, when activated, issues to the control input 1' of the scanner control device A a command to switch to slow scanning in the line direction. Hence from now on the record carrier is covered by adjacent reading bands which cover respective single lines of text, as is shown in FIG. 1 for bands LB1 . . . LB3. The retardation of the horizontal scanning travel can be obtained by causing the signal on input 1' of device A to switch the deflection timing circuit from the above-mentioned small capacitance to a larger capacitance, this being further explained hereinafter with reference to FIG. 4.

As mentioned, the coincidence condition for the AND gate UG1 between storers S and L is to be satisfied each time the first character line of a text portion is reached. For this purpose the system of FIG. 3 comprises a ringshift register R*p* whose storage capacity permits memorizing as many signal elements as occur in a single scanning column. The ringshift register is essentially constituted by a shift register R*p* composed of as many 1-bit storer members (FIG. 6*b*) as correspond to the just-mentioned storage capacity, in conjunction with an inhibit gate SG*p* and an OR gate OG*p*. The output *p* of register R*p* is feedback-connected through the inhibit gates SG*p* and through one input of the OR gate OG*p* with the input of the register. The second input *n* of gate OG*p* constitutes the input of the entire ringshift register and receives the scanner signals which occur step by step during each individual scanning column (scan) of a band, as explained above with reference to FIG. 1. The shifting of the stored signals from storer member to storer member in the shift register is synchronized with the scanning operation by means of a synchronizing pulse generator or master clock CL whose clock-pulse line T is connected with the scanner control device A as well as with the shift register R*p*.

Since the register R*p* has as many storer members as there may occur scanner signal elements within a scanning column, and since the stored signal elements are shifted in synchronism with the scanning operation, all of those scanner signal elements that may stem from area elements located in respectively different scanning columns but having the same height within these columns, are written into one and the same 1-bit storer member of the register R*p*. For example, when the scanning point advances step by step downwardly in a scanning column under control by the clock pulse and reaches a given height where it encounters an area element "1," a corresponding scanner signal element "1" is written into the ringshift register R*p*; and this same scanner signal element "1" remains preserved in storage even if in a next following scanning column no scanner signal element "1" but a signal element "0" is produced at the same height. This performance continues until the re-entering of a stored signal element "1" from the output *p* of regsiter R*p* back into its input is prevented by closing of the inhibit gate SG*p* due to appearance of a lockout signal at its lockout input.

Such a lockout signal may be supplied to the lockout input of gate SG*p* each time the end of a scanning band is reached and prior to commencing the next scanning band, the signal persisting for the duration of a scanning column. The ringshift register R*p* then contains a sequence of signal elements "1" that constitute an image of the projection of the already scanned band portion; and immediately prior to the occurrence of the lockout signal, this image constitutes the projection of the entire scanning band.

However, the lockout signal may also be applied to the inhibit gate SG*p* each time the rear boundary of a character scanned within a band is reached. Then a clearing signal "1" in a time position corresponding to the spacial position of this character in the line direction occurs at the lockout input of inhibit gate SG*p*. Each such clearing signal then prevents the projection of the character from being rewritten into the register. For example, if the conditions indicated in FIG. 1 are taken into account, the rear boundary of a character is recognized when the scanning point no longer encounters a "1" area element as it travel downward on the one scan denoted by "*n*," this character being the numeral "7." Accordingly, a clearing signal is applied to the inhibit gate, and the projection of this character "7" is cleared from the shift register R*p*. The manner and means of producing such a clearing signal after the rear boundary of a character is reached by the scanning columns, is described in the patent application Serial No. 194,287, filed May 14, 1962 now U.S. Patent 3,264,608. Reference in this respect may be had also to U.S. Patent 3,289,161 of R. Jurk et al. for Method and Means for Automatic Identification of Characters.

The ringshift register R*p* thus receives only the projection of the last-scanned portion of the band. More accurately, the ringshift register contains a projection of the band portion that is not located between the front edge of the band and the rear boundary of the last-scanned character as defined by the projection of such character.

In the following further description of the system according to FIG. 3, it is assumed that the ringshift register R*p* is operated in the manner last described; that is, each time the rear boundary of a character within a scanning band (for example SB3 in FIG. 1) is reached, a clearing signal "1" is supplied through lead *ze* to the lockout input of the inhibit gate SG*p* and causes the projection of this particular character to be cleared from the register R*p*. This has the advantage that the ringshift register R*p* may be identical with the ringshift register used in an associated circuit system for recognizing the rear boundary of a scanner character, such a system being described in U.S. application Ser. No. 194,287, mentioned above. While a character identifying system is not shown in FIG. 3 because not essential to the present invention, it will be understood that such a system, as well as further auxiliary circuit systems, may be connected to the scanner-signal lead *n* coming from the scanner OPS and to the clock-pluse lead or leads T, S*p* coming from the master clock CL. This is schematically represented in FIG. 3 at ACS. These auxiliary circuit systems may comprise devices for suppressing error signals, such as those described in U.S. Patent 3,289,163 of R. Jurk et al. for Circuit for Suppressing Scanner-Signal Deficiencies in Systems for Identification of Characters, and U.S. Patent 3,289,162, also of R. Jurk et al., for System for Suppressing Defects of Scanning Signals in the Automatic Identification of Characters.

The projection signal elements stored in register R*p* are supplied to one input *p* of a comparing and counting device which simultaneously receives on its second input *n* the corresponding scanner signal elements of each scanning column. This comparing and counting device may also be identical with the one contained in the above-mentioned system for recognizing the rear boundary of scanned characters according to the U.S. Patent 3,264,608. The comparing and counting device then recognizes the sequence of signal-element pairs which consist of a projection signal element and a scanner signal element both having the same position in the direction of the scanning columns; and the device ascertains the number of directly sequential signal-element pairs "10" that corresponds to a numerical range within predetermined limits, each pair "10" consisting of a projection signal element "1" and a scanner signal element "0" and being located between two signal-element pairs "00."

For this purpose, the above-mentioned signal input lead *n* is connected to the lockout input of another inhibit gate G*p*10 and to one of the lockout inputs of a NOR gate G*p*00. The respective two other inputs of these two gates are connected to the output of the ringshift register R*p*. The two gates thus receive stepwise the scanner signal elements produced during columnar scanning, as well as the projection signal elements that correspond thereto positionally within a scanning column and have been stored in, and shifted through, the register R*p*.

The NOR gate G*p*00 has its output connected through a 1-bit intermediate storer Sp00 to one input of an AND gate Gp0010, whose other input is connected with the output of the inhibit gate Gp10. Connected to the output of the AND gate Gp0010 is a counting device Zp10 which is synchronized by clock pulses supplied from the master clock CL through the pulse line T. Each time, when at the moment of a clock pulse the coincidence condition is met for the AND gate Gp0010, the counter Zp10 is switched forward one counting step, but if no coincidence occurs at gate Gp0010, the counter Zp10 is reset to the start position through a negator NG*pr*.

The counter Zp10 therefore counts the signal-element pairs "10" which occur during a scanning column, for example the column *n* indicated in FIG. 1, in direct succession to a signal-element pair "00"; and consequently the counter Zp10 also counts the projection signal elements "1" contained in that column. After each such sequence of signal-element pairs "10," the counter Zp10 is returned to starting condition, so that it will again commence a counting operation for each new sequence of signal-element pairs "10."

Depending upon how many signal-element pairs "10" follow directly upon each other, the counter Zp10 reaches a lower or higher counting step. The control (set) input of a bistable flip-flop stage Sp10 is connected to the one counting output of counter Zp10 which corresponds to the minimum number of projection signal elements "1" that may form the projection of a character to be automatically identified. The reset input of flip-flop stage Sp10 is connected through one input of an OR gate OG*pr* with the reset input of the counter Zp10, and is also connected through the other input of the same OR gate to another counting output of the counter Zp10 that corresponds to the maximum number of projection signal elements "1" that may still be indicative of a character to be identified.

At the end of a sequence of signal-element pairs "10" following a signal-element pair "00," the bistable flip-flop Sp10 is activated only if the length of this sequence is within the limits determined by the above-mentioned two counter outputs. If this is the case, and if the particular sequence of signal-element pairs "10" is directly followed by a signal-element pair "00" formed by a projection signal element "0" and a scanner signal element "0," thus satisfying the coincidence condition for a further AND gate Gz connected to the output of storer Sp0010 and the output of the NOR gate Gp00, then the coincidence condition is also met for the AND gate GZP which has its two inputs connected to the AND gate Gz and with the output of the bistable flip-flop Sp10. Under these conditions, a 1-bit storer SZP is activated through the AND gate GZP. Connected to the output of the storer SZP is the second control input of the above-mentioned AND gate UG1 which connects the above-mentioned first 1-bit storer S with the second 1-bit storer L and whose coincidence condition is to be met whenever the first character line of a text portion is reached.

As mentioned, since the flip-flop Sp10 is connected to predetermined counter outputs of counter Zp10, predetermined limits are set for any activation of the 1-bit storer SZP by a sequence of projection signal elements "1" and parallel-occurring scanner signal elements "0." By virtue of this performance, the 1-bit storer SZP is activated only if a sequence of projection signal elements "1" and conjointly a parallel occurrence of scanner signal elements "0" has been recognized, and if this sequence has such a length that it may constitute a projection image of a character to be automatically identified, whereas any sequences of projection signal elements "1" whose sequence length is too short or too long and hence is certain not to stem from the projection of a character to be automatically identified, remain ineffective from the outset because the storer SZP is not activated thereby.

For example, refer to the conditions schematically represented in FIG. 2. While the column *n* of the search band SB is being scanned, the counter Zp10 will reach a counting step that corresponds to the projection P stemming from the first character "7" of the line of text. At the moment when the scanning point, travelling downward in column *n*, reaches the lower limit of the character projection P7, this limit being indicated by a horizontal line *u*, the scanning point encounters an area element "0," and the corresponding projection signal element is an "0" element. At this moment, the simultaneous occurrence of a projection signal element "0" and of a scanner signal element "0" establishes coincidence for the NOR gate Gp00. At this moment, however, the bistable flip-flop Sp10 is still activated, so that the coincidence condition for the AND gate GZP is also met and the 1-bit storer SZP is activated.

In an analogous manner, the counter Zp10, during scanning of the column 1 indicated in FIG. 2 in searching band SB, will reach the counting step that corresponds to the projection P6 of the last character "6" in the line being scanned, this projection being indicated in the right-hand portion of FIG. 2. At the moment when the scanning point, travelling downward in column 1, reaches the lower limit of the character projection P6, this limit being indicated by a horizontal line *uu*, coincidence is established for the AND gate GZP, so that the 1-bit storer SZP would be activated if not in already activated condition.

The activation of the 1-bit storer SZP is indicative of the fact that the first character line of a text portion has been reached, whereafter, when the particular searching band SB is terminated, the advance of the scanning within the next following band is slowed down in the above-described manner. From now on, the particular text portion, inclusive of its first line of text, is covered by reading bands LB of which each covers only one line of text.

It should be understood, that for activating the 1-bit storer SZP and thereby reducing the scanning speed within a band, the first character line of a text portion need not be fully covered by the searching band SB as represented in FIGS. 1 and 2, consequently that the coincidence condition for the NOR gate GPOR need not necessarily depend upon occurrence of a signal-element pair "00" at the activation end of the flip-flop Sp10. It rather suffices that a sufficiently large portion of a character projection protrude from below into a searching band SB, so that at the end of the first scanning column behind the character, i.e. when the scanning point reaches the lower limit of the particular searching band SB, the bistable flip-flop Sp10 is activated and thus prepares the AND gate GZP at its lower input for subsequent occurrence of coincidence.

The coincidence condition for the AND gate GZP in the system of FIG. 3 is then met by virtue of the fact that an OR gate OG*z*S*p* is interposed ahead of the input of the AND gate GZP and has one input connected to the above-mentioned AND gate G*z*, the other input being connected to a pulse line S*p* which receives an end-of-scan signal "1" from the master clock whenever a scanning column is completed. If such protrusion of a sufficiently large portion of a character projection into a searching band SB is taken as criterion for the arrival of the first character line, a smaller amount of overlap between the seaching bands SB and consequently a lower scanning speed within the searching bands can be used.

As mentioned, the above-described portion of the system illustrated in FIG. 3 may be identical with the corresponding group of circuit components in a system for recognizing the rear boundary of individual characters to be identified, this system portion comprising the ring-shift register R*p* with the inhibit gate SG*p* and the OR gate OG*p*, as well as the comparing and counting device from its two inputs *p* and *n* up to the outputs of the AND gate GZ and of the flip-flop Sp10 respectively. If the corresponding components of a rear-boundary recognizing system, described in the above-mentioned U.S. Patent 3,264,608, are used in this manner, the same group of circuit components also operates to recognize and adjust the scanning operation with respect to the first character line of a text portion.

Figure 5:
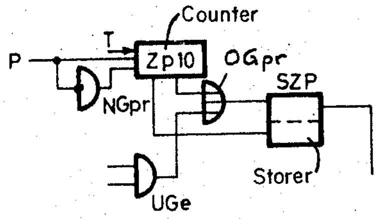
FIG. 5 shows a modified circuit detail applicable in a system otherwise corresponding to FIGS. 3 and 4.

If no such use is made of a rear-boundary recognizing system, the system shown in FIG. 3 can be simplified by connecting the counting device Z*p*10 directly to the output of the ringshift register R*p*. This is illustrated in FIG. 5 which represents only the modified components of the system otherwise corresponding to FIG. 3. With such a modification, the counter Z*p*10, directly connected to the output *p* of the ringshift register R*p*, counts only the directly sequential projection signal elements "1"; and the bistable flip-flop S*p*10, omitting the connection between the negator NG*pr* and the reset input of this flip-flop, becomes identical with the 1-bit storer SZP, also as shown in FIG. 5.

It has been explained above with reference to FIG. 3 how the activation of the 1-bit storer SZP, when the first character line of a text portion is reached, prepares the second control input of the AND gate UG*l* for coincidence, so that thereafter the second 1-bit storer L may become activated in lieu of the previously activated first 1-bit storer S, thus reducing the scanning advance in the line direction of the scanning bands, whereafter the text portion can be read line by line. It is preferable to effect such switching from "searching" to "reading" at the end of the searching band SB which covers the first character line of a text portion. For this purpose, the system shown in FIG. 3 is equipped with further logic components, described presently.

Connected to the first 1-bit storer S is an AND gate UG*bs* which leads to a first monostable flip-flop TS whose working cycle corresponds to the time during which a searching band SB travels across the record carrier P at the high speed of scanning advance in the line direction. Analogously, an AND gate UG*bl* is connected to the seocnd 1-bit storer L and leads to a second monostable flip-flop TL whose working-cycle period is equal to the time during which a reading band LB passes across the record carrier P at the slow advancing speed of the scanning operation.

The two AND gates UG*bs* and UG*bl* have their respective other inputs connected to a 1-bit storer B which, as will be further explained below, is activated each time for the duration of a scanning band SB or LB just passing across the record carrier P, and which opens the particular AND gate UG*bs* or UG*bl* for this interval of time. Two inputs of an OR gate OG*be* are connected to the respective outputs of the two monostable flip-flops TS and TL, the latter outputs being activated in the normal condition of rest. The output of the OR gate OG*be* is connected through a differentiating member D*be* to the control (set) input of a bistable flip-flop S*be*. Accordingly, the flip-flop S*be* is activated each time one of the two monostable flip-flops TS, TL returns from the working condition to the rest condition. The same function can be obtained by connecting the two inputs of the OR gate OG*be* to the respective outputs of these monostable flip-flops which are activated in the working condition of the latter, a negator then being inserted between the OR gate OG*be* and the differentiating member D*be.*

Connected to the output of the bistable flip-flop S*be* is an AND gate UG*e* whose other input is connected to the end-of-column pulse lead S*p* which carries a signal "1" each time the end of a scanning column is reached. Consequently, the output of the AND gate UG*e* always furnishes an output signal at the end of a scanning column within which one of the two monostable flip-flops TS, TL has terminated a working cycle so that the interval of time required for a searching band SB or a reading band LB has elapsed. The output signal from the AND gate UG*e* determines the end of the scanning band SB or LB which has just passed across the record carrier P.

This output signal is supplied to a third input of the AND gate UG*l* which is interposed between the above-mentioned first 1-bit storer S and the second 1-bit storer L. As a result, the scanning advance within the individual scanning bands is slowed down by activation of storer L and resetting of storer S at the moment when the additional 1-bit storer SZP is activated just at the end of the particular searching band SB, thus indicating that the first character line of a text portion has been reached. Simultaneously, the storer SZP, the bistable flip-flop S*be* and the 1-bit storer B, all having their reset inputs connected to the output of the AND gate UG*e*, are reset to the rest condition.

The output of the AND gate UG*e* is further connected through a lead *e* with a third monostable flip-flop TR through a further AND gate UG*es* whose other input is connected to the output *f* of the first 1-bit storer S. An OR gate OG*e* is interposed between gate UG*es* and flip-flip TR. The monostable flip-flop TR is activated each time for the duration of a working cycle after termination of a searching band SB. When activated, the flip-flop TR issues to the control input *r* of the scanner control device A a command for returning the scanning point to the beginning of the next scanning band. When the flip-flop TR returns to its rest position, it activates the 1-bit storer R. For this purpose, the output of the monostable flip-flop TR, which is activated in the rest condition, is connected through a differentiating member D*ba* with the control (set) input of the 1-bit storer B. Inserted into this connection is an AND gate UG*b* whose other input is connected to the output of an additional 1-bit storer SS.

The control input of storer SS is connected to the start line *st* which receives a starting pulse at the moment when the scanning of the record carrier P is to be commenced. The reset input of storer SS is connected to a stop line *stp* which receives a stop pulse when the scanning of the record carrier P is to be terminated or interrupted, for example when the attendant person actuates a push-button contact in line *stp*.

The start-pulse line *st* is also connected with the second input of the OR gate OG*e*. This gate has a third input which receives a control signal "1" in dependence upon completion of a scanning band and consequently when an output signal appears at the output of the above-mentioned AND gate UG*e*, provided the above-mentioned second 1-bit storer L is simultaneously activated. This condition is satisfied if reading bands LB are just being passed over the record carrier P. The supply of such a control signal "1" at the termination of a reading band, if no further conditions are to be satisfied at the third input of the OR gate OG*e*, can be effected by connecting the AND gate UG*e* and the second 1-bit storer L with the two inputs of an AND gate UG*el* landing to the third input of the OR gate OG*e*.

The above-described system of FIG. 3 operates as follows.

The scanning operation is initiated by supplying a starting pulse on the start line *st*. This pulse passes through the OR gate OG*e* and activates the monostable flip-flop TR for the duration of a working cycle, so that the flip-flop TR issues to the control input *r* of the scanner control device A a signal which causes the scanning point to be directed to the beginning of a scanning band. The same start pulse activates the first 1-bit storer S, so that the scanner control device A receives at its input *s* a signal calling for rapid scanning advance in a searching band SB. The start pulse also activates the 1-bit storer SS, thus preparing the AND gate UG*b* at its upper input for coincidence.

At the moment when the monostable flip-flop TR completes its cycle, and the scanning point has reached the starting point of the searching band now to be drawn across the record carrier P, a control pulse is transmitted to the 1-bit storer B through the differentiating member D*ba* and the AND gate UG*b* now closed by the activation of the 1-bit storer SS. The now activated 1-bit storer B passes from its output a signal to the control input *b* of the scanner control device A which causes the columnar scanning in the first searching band, for example band SB in FIG. 1, to commence. Simultaneously the monostable flip-flop TS is activated to perform a working cycle, due to the fact that the AND gate UG*bs* is now open. When the flip-flop TS returns to its stable condition, the record carrier P has just been covered by a searching band SB1 whose length across the carrier corresponds to the length of a line of text.

When the monostable flip-flop TS returns to its stable condition of rest, the OR gate OG*be* and the differentiating member D*be* pass a control pulse to the bistable flip-flop S*be*, thus activating this flip-flop which thereby prepares the AND gate UG*e* for coincidence. The coincidence condition is completed when the next following end-of-column signal "1" occurs, namely at the end of the band being scanned. Now an output signal occurs at the AND gate UG*e* which determines the end of the first searching band SB1 and returns the 1-bit storer B to its condition of rest, thus cancelling the control signal previously impressed upon the control input *b* of the scanner control device A.

Assume that the first searching band SB1 does not cover a line of text, as is indicated in FIG. 1. Consequently, at the end of searching band SB1, the 1-bit storer SZP is not activated so that the coincidence condition for the AND gate UG*l* is not met and no switching from "searching" to "reading" by activation of storer L and resetting of storer S takes place. The storer S rather remains activated and maintains the signal at the control input *s* of the scanner control device A. Simultaneously, the AND gate UG*es* is opened so that the output signal of the AND gate UG*e*, indicating the end of the first searching band SB1, passes through gate UG*es* to the input of the monostable flip-flop TR.

While the monostable flip-flop TR thereafter performs an operating cycle in the manner already described, it issues a control signal to the inuput *r* of the scanner control device A with the effect of darkening the scanning point and returning it to the beginning of a scanning band. Thereafter the differentiating member D*ba* and the AND gate UG*b* again pass a control pulse to the 1-bit storer B and thereby again activate the storer B. As a result, the control input *b* of the scanner control device A again receives a control signal on account of which the next scanning band is passed across the record carrier P. Since simultaneously a control signal is impressed upon input *s* of control device A, this band involves a fast advance of the scanning point in the line direction and therefore again operates as a searching band.

As this second searching band SB2 (FIG. 1) is being passed across the record carrier, the above-described operations are repeated. As illustrated in FIG. 1, the second searching band again does not cover the first character line of the text portion. Although the scanning band SB2 covers a slight portion of the characters contained in the first text line "7766," this portion is not sufficient for switching the counting device Z*p*10 forward a sufficient amount to activate the bistable flip-flop S*p*10. Consequently at the end of the searching band SB2, the 1-bit storer SZP is not activated, so that no switching from "searching" to "reading" takes place.

As a result, and in analogy to the operations already described, a third searching band SB3 (FIG. 1) is now passed across the record carrier P. As this third searching band is being scanned, the counting device Z*p*10 becomes effective as follows. The counting device counts the projection signal elements "1" of the characters now encountered. These signal elements "1" occur in parallel relation to respective scanner signal element "0." While the first character "7" of the text line "7766" is being scanned in this manner, and when the following characters "7," "6," and "6" are being scanned, there occurs each time a counting step at which the bistable flip-flop S*p*10 is activated at the occurrence of a signal-element pair "00" directly following the counted sequence of signal-element pairs "10." Consequently at the end of the searching band SB3, the 1-bit storer SZP is activated. At the moment when at the output of the AND gate UG*e* there occurs a signal indicative of the fact that the end of the third searching band SB3 has been reached, the coincidence condition for the AND gate UG*l* is satisfied. Consequently now the second 1-bit storer L is activated and the first 1-bit storer S is reset. As a result, the control input 1′ of the scanner control device A receives a command which causes a slow scanning advance in the scanning bands, so that from now on each character line is covered by a single scanning band.

As mentioned above, the switching from fast to slow scanning speed is preferably effected by substituting a capacitor of relatively small capacitance by a capacitor of larger capacitance for controlling the horizontal deflection of the scanning point, this substitution being controlled by the signal applied to the input 1′ of the scanner control device A. The output signal coming from the AND gate UG*e* at the moment the third searching band SB3 is terminated, resets the 1-bit storers B and SZP and also releases the monostable flip-flop TR through the AND gate UG*es* to perform a working cycle during which the scanning point is directed back to the beginning of a scanning band.

After the scanning point has thus returned to the start position, the 1-bit storer B is again activated in analogy to the operations already described. Since now the second 1-bit storer L is in working condition, the AND gate UG*bl* is open for an output signal from the 1-bit storer B, so that now the monostable flip-flop TL is caused to perform a working cycle. The cycle period of the monostable flip-flop TL is longer than that of the monostable flip-flop TS. That is, the flip-flop TL remains active for an interval of time of such a duration that during the now slower advance of the scanning, a band equal to the length of a character line is again passed across the record carried P. This band, referring to the conditions exemplified by FIG. 1, constitutes the first reading band LB1.

The first reading band LB1 terminates at the moment when the monostable flip-flop TL completes its operating cycle and the AND gate UG*e* issues an output signal in analogy to the operations already described. This output signal resets the 1-bit storer B. In the course of the first reading band LB1, the first character line of a text portion is fully covered, as represented in FIG. 1. Consequently, the characters contained in this line can be automatically identified successively during columnar scanning.

The output signal from AND gate UG*e*, indicating that the first reading band LB1 is terminated, causes the scanning point to return to the beginning of the next scanning band during an operating cycle of the monostable flip-flop TR. Thereafter the operations described above for the first reading band LB1 are repeated while the second reading band LB2, covering the second line of text, is drawn across the record carrier.

It is preferable to advance the record carrier P at a constant advancing speed equal to the ratio of the character-line spacing to the interval of time required for a reading band (sum of the working cycles of the monostable flip-flops TL and TR). Under these conditions it suffices to connect the output of the AND gate UG*e* directly, or through the AND gate UG*el*, with an input of the OR gate OG*e* which precedes the monostable flip-flop TR, this having the desired effect that each individual character line of the text portion is covered by a single reading band.

After completing the scanning of the second line of text, a third reading band LB3 is passed across the record carrier for scanning the third line. If the scanning is to be terminated or interrupted, a stop pulse is applied through line *stp* to the reset input of the 1-bit storer SS, for example by the attending person actuating a push-button contact. The storer SS returns to the condition of rest so that the AND gate UG*b* has its upper input no longer prepared for coincidence. However, no further influence is imposed upon any still proceeding scanning operation which is continued until the end of the scanning band is reached. Then the output signal from AND gate UG*e* activates the monostable flip-flop TR to perform an operating cycle while the scanning point is simultaneously returned to the beginning of the scanning band. Thereafter the control pulse transmitted through the differentiating member D*ba* during return of the monostable flip-flop TR to its stable condition of rest, cannot pass through the AND gate UG*b* to the set input of the 1-bit storer B. Hence no command for commencing another scanning band is given to the control input *b* of the scanner control device A.

The provision of the AND gate UG*b*, having one input connected to the 1-bit storer SS that receives the start and stop pulses, thus affords an operation according to which the scanning of a record carrier P commences always at the beginning of a full scanning band in response to a start pulse supplied to the control input of the 1-bit storer SS, and a stop pulse supplied to the reset input of the same storer SS causes an interruption or termination of the scanning operation only upon completion of a scanning band.

As a rule, the individual character lines within a text portion follow each other at uniform distances. However, the record surface may comprise several text portions spaced from each other a larger or smaller distance. As long as the spacing between the last character line of a text portion and the first character line of the next following portion is equal to an integral multiple of the mutual spacing between the character lines within a text portion, the in-frame alignment of the scanning bands with respect to the character lines of the first text portion remains correct with respect to the character lines of the next text portion. Generally, however, the last character line of a text portion is irregularly spaced from the first character line of the next portion. Consequently after one text portion is scanned, the scanning bands must again be aligned to coincide with the character lines of the following text portion.

Such repeated alignment is automatically effected in the system shown in FIG. 3 without appreciable increase in equipment. For this purpose, an OR gate OG*s* is interposed ahead of the set input of the first 1-bit storer S, and the start pulse from lead *st* is also supplied to one input of this OR gate. The other input of gate OG*s* is connected to the output of an AND gate UG*s* for which the coincidence condition is met at the end of a reading band in the event no character has been recognized within this slow scanning band. The AND gate UG*s* has three inputs of which one is connected to a line $\overline{ZE}$ on which the signal condition "1" obtains when no character is recognized in a scanning band LB in which the scanning advances slowly in the line direction. The second input of gate UG*s* is connected to the second 1-bit storer L, and the third input is connected to the output of the AND gate UG*e* which furnishes an output signal at the end of the scanning band. These additional connections have the effect that when no identifiable character has been recognized within a reading band LB, the first 1-bit storer S is again activated upon termination of this reading band LB, and the second 1-bit storer L is simultaneously reset to the condition of rest. Now the control input *s* of the scanner control device A receives a command for rapid scanning advance, so that the following bands extending across the record carrier will again overlap and operate as searching bands SB. In this manner the system automatically switches from "reading" to "searching" and maintains the "searching" operation until the first character line of the following text portion is recognized. Thereafter the system switches from "searching" back to "reading" in the manner described, whereafter each individual line in the next text portion is covered by a single reading band.

The end of a text portion, or more accurately the next following reading band in which no automatically identifiable character is recognized, thus serves as a reference for automatically releasing the searching operation for the next text portion and for aligning the scanning bands with respect to the character lines of this portion. The absence of an identifiable character in the reading band following a text portion is preferably indicated by the signal condition of the lead $\overline{ZE}$. This lead is controlled by an AND gate which has one input connected to the output of a bistable flip-flop stage, the other input of the AND gate being connected to the output of the 1-bit storer B, the output of the AND gate forming the lead $\overline{ZE}$ shown in FIG. 3. The last-mentioned bistable flip-flop has its reset input connected to the AND gate UG*e* and is activated by an end-of-character signal as incorporated in a circuit system for determining the position of characters to be automatically identified, such as the system described in the above-mentioned U.S. Patent 3,264,608.

Details of the scanner OPS and the scanner control device A (FIG. 3) will now be described with reference to the circuit diagram shown in FIG. 4.

Figure 4:
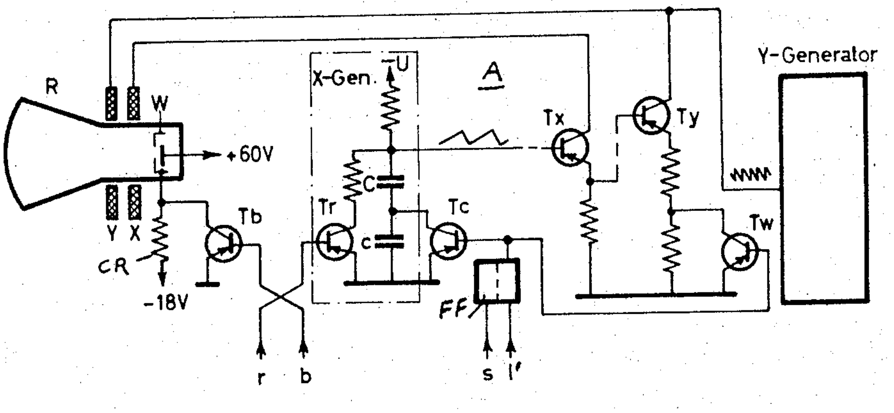
FIG. 4 is a schematic circuit diagram of a scanning device which forms part of the system shown in FIG. 3.

In FIG. 4 the scanner is represented only by its cathode-ray (orthicon) tube R with deflector coils X, Y and a brightness control electrode W. The electrode W receives a bias voltage through a series-connected resistor CR so that the scanning point is originally dark. When a control signal is impressed upon the input *b* as explained above with reference to FIG. 3, a transistor T*b* is turned on and shorts the resistor R. The control electrode W then receives more voltage and the scanning point becomes bright, thus permitting the columnar scanning of the record carrier P (FIG. 3) or of the image optically thrown upon the target plate of the tube.

The current for the horizontal deflection of the scanning point by means of coil X is produced by a saw-tooth generator X-GEN. A group of capacitors in the X-generator is charged through a resistor from a source of operating voltage −U. The capacitor group has a lower or higher capacitance as explained above with reference to FIG. 3, so that the capacitor voltage increases more rapidly or slowly and the scanning point is deflected either rapidly or slowly in the horizontal direction. For this purpose, the capacitor group is constituted by a series connection of two individual capacitors C and *c*. A transistor T*c* is connected in shunt to one of the capacitors. When a signal is applied to the control input *s* of the scanner control device, the transistor T*c* is turned off so that now both capacitors are effective in series. This capacitor combination has a low total capacitance. Consequently, the saw-tooth voltage occurring at the capacitor combination increases at relatively high speed, and the horizontal deflection current flowing through the transistor T*x* increases at a corresponding speed so that a rapid horizontal deflection of the scanning point takes place.

When a signal is impressed upon the signal input 1' of the control device, the transistor T*c* is turned on and shorts the capacitor *c*. Now the other capacitor C is alone effective. The capacitor combination therefore now has a larger capacitance than previously, so that the capacitor voltage increases more slowly. Consequently, the horizontal deflection current flowing through the transistor T*x* also increases slowly, and the scanning point is horizontally deflected at reduced speed.

Each time a scanning band has fully covered the record carrier, a control signal occurs at the signal input *r*, also as described above with reference to FIG. 3. This control signal causes the transistor T*r* to close and to discharge the capacitor combination so that the scanning point is deflected back to the beginning of the scanning band.

The vertical deflection current is produced by another saw-tooth generator Y-GEN designed in the same manner as the X-generator. As mentioned above, it is preferable to equalize or compensate the continuous motion of the record carrier P for the duration of the scanning operation within one and the same scanning band. This can be done by superimposing upon the vertical deflection voltage from the Y-generator another saw-tooth voltage whose amplitude corresponds to the advancing speed of the record carrier, whose polarity is opposed to that of the vertical deflection voltage, and whose frequency corresponds to the scanning advance within the scanning band in the direction of the character lines. This operation is performed by an auxiliary transistor T*y* which is connected with the transistor T*x* so that the transistor T*y* is traversed by a current whose curve corresponds to that of the horizontal deflection current. This current through the transistor T*y* is superimposed in bucking relation upon the vertical deflection current furnished from the Y-generator.

It is preferable that the amplitude of the superimposed current be dependent upon whether the scanning within a band occurs at rapid or slow speed. For this purpose the emitter-resistor of the transistor T*y* is subdivided, and another transistor T*w* is connected in shunt with one of the two resistor portions. The transistor T*w* is controlled in the same manner as the transistor T*c* so that it is turned off when a signal is impressed upon the input *x*, and is turned on when a signal occurs on the input 1'. In the latter case the conducting transistor T*w* shorts the lower portion of the emitter transistor. Depending upon which of the control signals is effective at a time, either the entire emitter resistance or only a portion of this resistance is active in the circuit of the transistor T*y*, so that the current superimposed upon the vertical deflection current is effective with a small amplitude when the scanning advances rapidly within a scanning band, but is effective with a large amplitude when the scanning advances at slow speed within a band.

It will be understood that the logic components illustrated in FIG. 3 may consist of any conventional circuit components. Reference in this respect may be had, for example, to Computer Basics, published 1962 by Howard W. Sams & Co., Inc., New York, volume 4, Chapter 6, and volume 6, Chapter 9. We prefer using solid-state circuit components as described, for example, in the German publication "Entwicklungsberichte der Siemens & Halske AG" vol. 22, 2nd Sequence, pages 159–171, August 1959. Examples of such components are illustrated on the accompanying drawings in FIGS. 6*a* through 6*k*.

Figure 6B:
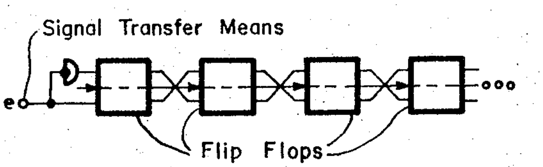
Figure 6C:
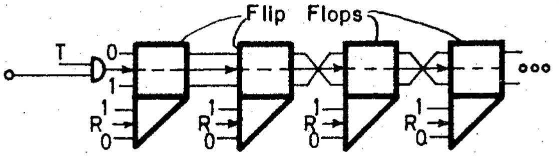
Figure 6D:
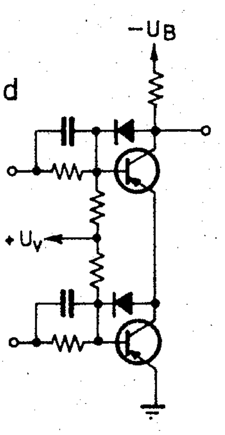
Figure 6D:
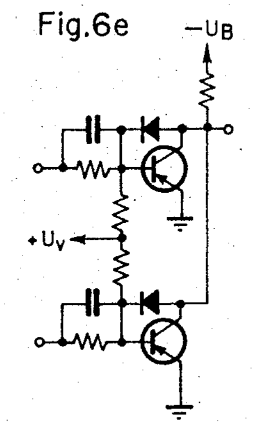
Figure 6F:
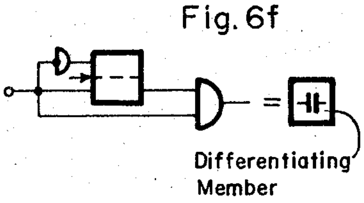
Figure 6F:
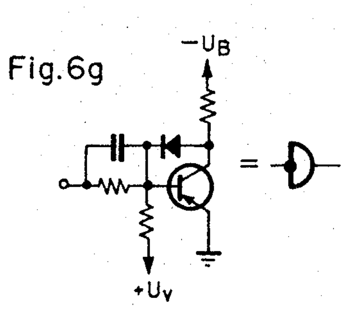
Figure 6F:
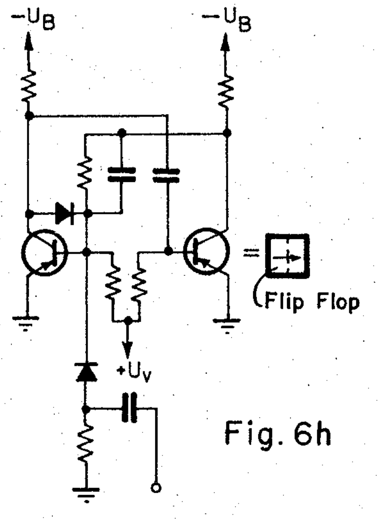

FIG. 6*a* shows a bistable flip-flop stage with two control inputs. FIG. 6*b* shows a shift register composed of such bistable flip-flops (R*p* in FIG. 3). FIG. 6*c* shows a counter composed of bistable flip-flops according to FIG. 6*a* (Z*p*10 in FIG. 3). FIGS. 6*d* and 6*e* shows basic gate circuits with whose aid the various gates can be realized. FIG. 6*f* shows a differentiating member (D*ba*, D*be* in FIG. 3). FIG. 6*g* shows a negator (for example NG*pr* in FIG. 3); and FIG. 6*h* shows a monostable flip-flop stage (TL, TS in FIG. 3).

To those skilled in the art, it will be obvious upon a study of this disclosure that our invention permits of a great variety of modifications and can be given embodiments other than particularly illustrated and described herein, without departing from the essential features of our invention and within the scope of the claims annexed hereto.

We claim:

1. The method of scanning a line-by-line text on a record carrier advancing relative to a scanner in a direction perpendicular to the text lines, which comprises (a) scanning in parallel scan columns a band area extending in the line direction across the record carrier at a band width covering a single text line;

(b) setting the speed of scanning advance in the line direction relative to the speed of record carrier advance to an increased value at which successive scanning bands overlap each other and a carrier area corresponding to that occupied by a text line is sequentially included in at least two bands;

(c) storing during scanning of each band any occurring scanner signal elements "1" in accordance with their respective positions within the scan columns and conjointly with any previously stored scanner signal elements "1";

(d) recognizing at the end of the respective bands the occurrence of a sequence, within given numerical limits, of said stored signal elements as indicative of reaching the first text line of a text portion; and (e) reducing the speed of scanning advance in the line direction relative to the speed of record carrier advance, in response to said occurrence to place said scanning bands substantially adjacent to each other for then covering each text line by only one of said respective bands.

2. The scanning method according to claim 1, which comprises the subsequent step of (f) increasing the scanning speed in the line direction in response to absence of identifiable characters in a band scanned at reduced speed, whereby the scanning bands are caused to again overlap and a carrier area corresponding to that occupied by a text line is again sequentially included in at least two scanning bands; and thereafter repeating steps (c) to (e).

3. The scanning method according to claim 2, wherein the height BH of the scanning bands, the height SZH of the text characters in each line and the mutual line spacing SZA in a text portion are related to the carrier advancing speed $v_p$ in accordance with the condition:

$$\frac{\frac{1}{2}\left(\frac{BH}{K}-SZH\right)}{TSB}=\frac{SZA}{TLB}=v_p$$

wherein TSB and TLB denote the periods of time required respectively for fast scanning and slow scanning of a band, and $K \geq 1$ is a safety factor.

4. The scanning method according to claim 1, which comprises advancing the record carrier at constant speed; scanning by means of vertical and horizontal sawtooth deflection voltages corresponding to scanning advance in the column direction and in the text line direction respectively; and superimposing upon the vertical deflection voltage, for the duration of the scanning within each band, a compensating saw-tooth voltage having an amplitude corresponding to the carrier advancing speed and having a polarity opposed to that of the vertical deflection voltage and a frequency corresponding to the scanning advance in the text line direction.

5. The scanning method according to claim 4, which comprises controlling the horizontal deflection voltage by capacitve timing means, and reducing the scanning advance in the line direction by changing the effective capacitance of the timing means from a lower to a higher value.

6. System for scanning a line-by-line text on a record carrier advancing perpendicularly to its lines of text, comprising a columnar scanner for scanning a frame band of the carrier surface as the carrier passes by the scanner and issuing scanner signal elements "1" and "0" depending upon whether character area elements and background elements respectively are encountered by the scanning point in each scanning column; a scanner control device having horizontal deflection means and vertical deflection means for the scanning point in the column and text-line directions respectively, said control device having selective speed control means for setting the scanning advance in the line direction to given high and low speeds respectively; start control means connected with said selective speed control means for setting said scanning advance in the line direction to said high speed at which successive scanning bands overlap each other and a carrier area corresponding to that occupied by a text line is sequentially included in at least two bands; and a network of logic circuits having input means connected with said scanner for receiving said signal elements and having output means connected to said selective speed control means for setting the scanning advance to said low speed in response to occurrence of a sequence of signal elements "1" indicative of reaching the first line of text for then covering each text line by only one of said respective bands.

7. A system for scanning a line-by-line text on a record carrier advancing relative to a band-frame scanner, comprising a signal input lead for receiving scanner signal elements "1" and "0" depending upon whether character area elements and background elements respectively are encountered by the scanning point in each scanning column; a scanner control device having horizontal deflection means and vertical deflection means for deflecting the scanning point in the column and text-line directions respectively, said control device having selective speed control means for setting the scanning advance in the line direction to given high and low speeds respectively; start control means connected with said selective speed control means for setting said scanning advance in the line direction to said high speed at which successive scanning bands overlap each other and a carrier area corresponding to that occupied by a text line is sequentially included in at least two bands; register means connected to said signal input lead for storing, during scanning of each band, any occurring scanner signal elements "1" in accordance with their respective positions within the scan columns and conjointly with any previously stored scanner signal elements "1"; a counter connected to said register means for recognizing at the end of the respective bands the occurrence of a sequence, within given numerical limits, of said stored signal elements as indicative of reaching the first text line of a text portion; and circuit means connecting said counter with said selective speed control means for reducing the scanning advance in the line direction in response to said occurrence to place said scanning bands substantially adjacent to each other for then covering each text line by only one of said respective bands.

8. Scanning system according to claim 7, comprising discriminating means connected to said counter and to said selective speed control means for setting the scanning advance back to said high speed in response to absence of a character in a text line during low-speed scanning.

9. In a scanning system according to claim 6, said start control means comprising a first 1-bit storer (S), start-pulse supply means connected to said first storer for activating it, said storer having an output connected to said selective speed control means for setting said scanning advance to said high speed in response to a start pulse; said network comprising a second 1-bit storer (L) having an output connected to said selective speed control means for setting said scanning advance to said low speed when activated, a first coincidence gate (UG1) connecting the output of said first 1-bit storer with the activating input of said second 1-bit storer and being conductive only in response to said occurrence indicative of reaching the first text line, said first gate having an output connected with the reset input of said first 1-bit storer.

10. In a scanning system according to claim 9, said register means comprising a ringshift register having a storage capacity corresponding to the number of scanner signal elements occurring in a scanning column, whereby said register contains a projection of the last-scanned portion of a band, said register having an output connected to the input of said counter; said counter having count stages corresponding to given minimum and maximum numbers respectively of directly sequential projection signal elements "1" indicative of identifiable characters in a band being scanned; a bistable flip-flop (Sp10) having a set input and a reset input connected to said minimum and maximum count stages respectively; said first coincidence gate (UG1) having a control input operatively connected to the output of said bistable flip-flop.

11. A scanning system according to claim 10, comprising a NOR gate (Gp00) having two inputs connected to a signal input lead and to the output of said ringshift register, a 1-bit intermediate storer (Sp00) having an input connected to the output of said NOR gate, a second AND gate (Gp0010) having two inputs of which one is connected to the output of said intermediate storer (Sp00), an inhibit gate (Gp10) having two inputs connected with said respective two inputs of said NOR gate (Gp00), said inhibit gate having an output connected to the other input of said second AND gate (Gp0010), the output of said second AND gate being connected to the input of said counter (Zp10), a third AND gate (GZP) having two inputs of which one is connected to the output of said bistable flip-flop (Sp10), a third 1-bit storer (SZP) connecting the output of said third AND gate (GZP) with another control input of said first coincidence gate (UG1), another 1-bit intermediate storer (Sp0010) and a fourth AND gate (Gz) serially connecting the output of said second AND gate (Gp0010) with said other input of said third AND gate (GZP), said fourth AND gate having an input connected to the output of said NOR gate (Gp00).

12. A scanning system according to claim 11, comprising an OR gate (OGzSp) having two inputs of which one is connected to the output of said fourth AND gate (Gz), an end-of-column signal lead connected to said other input of said OR gate, the output of said OR gate being connected to said other input of said third AND gate (GZP).

13. A scanning system according to claim 9, comprising a fifth AND gate (UGbs) having an input connected to the output of said first 1-bit storer (S) and being closed for the duration of each scanning band, a first monostable flip-flop connected to the output of said fifth AND gate and having a cycle period equal to the duration of a band at said high speed; a sixth AND gate (UGbl) having an input connected to the output of said second 1-bit storer (L) and being also closed for the band duration; a second monostable flip-flop (TL) connected to the output of said sixth AND gate and having a cycle period equal to the duration of a band at said low speed, a bistable flip-flop (Sbe) connected to the outputs of said first and second monostable flip-flops and being activated when in condition of rest, a seventh AND gate (UGe) having two inputs connected to the output of said bistable flip-flop and to said end-of-column signal lead (Sp) respectively, whereby the output signal of said seventh AND gate indicates the end of a scanning band, and signal transfer means (*e*) connecting said latter output to said scanner control device.

14. A scanning system according to claim 13, comprising an OR gate (OGbe) interposed between said bistable flip-flop and said first and second monostable flip-flops, said OR gate having two inputs connected to the respective outputs of said first and second monostable flip-flops, and a differentiating member (Dbe) interposed between the output of said OR gate and the set input of said bistable flip-flop.

15. A scanning system according to claim 13, comprising a fourth 1-bit storer (B) having an output connected to said fifth and sixth AND gates (UGbs), (UGbl) for closing them and having a reset input connected to said signal transfer means (*e*) to receive said end-of-band pulse from said seventh AND gate; a third monostable flip-flop (TR) having an output connected to said scanner control device for controlling it to return the scanning point to the beginning of the next band when said latter flip-flop is activated, said third monostable flip-flop having a control input connected to said signal transfer means, and a differentiating member (Dba) connecting said third monostable flip-flop with said fourth 1-bit storer (B) for activating it when said third monostable flip-flop returns to stable rest condition.

16. A scanning system according to claim 15, comprising an eighth AND gate (UG*es*) and a third OR gate (OG*e*) serially connecting said end-of-band pulse transfer means to said third monostable flip-flop (TR), said eighth AND gate having a timing input connected to the output of said first 1-bit storer (S), and said third OR gate having an input means connected to said start control means to receive a pulse when beginning the scanning of a record carrier.

17. A scanning system according to claim 16, comprising a ninth AND gate (UG*el*), said third OR gate having another input connected with the output of said ninth AND gate, and said latter gate having two inputs connected with said signal transfer means and with the output of said second 1-bit storer (L) respectively.

18. A scanning system according to claim 15, comprising a tenth AND gate (UG*b*) interposed between said fourth 1-bit storer (B) and said differentiating member (D*ba*), the output of said latter gate being connected with the set input of said latter storer, said tenth AND gate having two inputs of which one is connected with said differentiating member; a fifth 1-bit storer (SS) having an output connected to the other input of said tenth AND gate, said fifth 1-bit storer having a set input connected to said start control means to receive a start pulse at the beginning of a scanning operation, and stop control means connected to the reset input of said fifth 1-bit storer, whereby upon receipt of a stop pulse by said fifth storer the scanning of a record carrier is terminated at the end of a scanning band.

19. In a scanning system according to claim 13, said first AND gate (UG*l*) having a third input connected with said end-of-band signal transfer means to receive a pulse from the output of said seventh AND gate (UG*e*).

20. A scanning system according to claim 9, comprising an OR gate (OG*s*) serially connected between said start control means and said first 1-bit storer (S) for passing a start pulse to said latter storer, an AND gate (UG*s*) having an output connected to an input of said OR gate and having input means for supplying a signal in response to absence of an identifiable character in a slow-speed band.

21. A scanning system according to claim 20, comprising a signal lead ($\overline{ZE}$) having the signal condition '1" in response to said character absence, said latter AND gate (UG*s*) having three inputs connected respectively to said lead, to the output of said second 1-bit storer, and to said end-of-band signal transfer means.

No references cited.

ROBERT L. GRIFFIN, *Primary Examiner.*

J. A. ORSINO, *Assistant Examiner.*